United States Patent [19]

Hollander

[11] 4,157,275

[45] Jun. 5, 1979

[54] POLYVINYL ALCOHOL FIBERS CONTAINING ACICULAR COLLOIDAL CLAY

[75] Inventor: Orin Hollander, Piscataway, N.J.

[73] Assignee: Engelhard Minerals & Chemicals Corporation, Edison, N.J.

[21] Appl. No.: 860,296

[22] Filed: Dec. 14, 1977

[51] Int. Cl.² ............................................. D21F 11/00
[52] U.S. Cl. ................................. 162/146; 162/157 R; 162/181 D; 428/372
[58] Field of Search ............... 162/146, 157 R, 168 R, 162/181 R, 181 D; 264/185; 260/42.51, 37 NP; 428/372, 394

[56] References Cited

U.S. PATENT DOCUMENTS

| 2,251,296 | 8/1941 | Shipp | 264/185 |
| 2,641,557 | 6/1953 | Green | 260/42.51 |
| 3,409,598 | 11/1968 | Takigawa et al. | 264/185 |
| 3,582,462 | 6/1971 | Ashikaga et al. | 162/157 R |

FOREIGN PATENT DOCUMENTS

| 37-3502 | 1962 | Japan | 162/181 R |

Primary Examiner—S. Leon Bashore
Assistant Examiner—Peter Chin
Attorney, Agent, or Firm—Inez L. Moselle

[57] ABSTRACT

Polyvinyl alcohol fibers having needle-like crystals of colloidal clay, especially attapulgite or sepiolite clay, disseminated therein in amount within the range of from 30% to 75% of the dry weight of the fibers. The composite fibers are capable of being partially or totally substituted for cellulose fibers in the making of paper products by conventional paper-forming means.

10 Claims, No Drawings

POLYVINYL ALCOHOL FIBERS CONTAINING ACICULAR COLLOIDAL CLAY

BACKGROUND OF THE INVENTION

1. Field of the Invention

This invention relates to synthetic fibers useful, for example, as a partial or total replacement for cellulosic fibers in papermaking using conventional papermaking means. In particular, the invention relates to novel polymeric-inorganic mineral composite fibers useful for such purpose, to the manufacture of such fibers, preferably by wet spinning, and to the use thereof in papermaking.

2. Prior Art

Synthetic fibers are well known substitutes or additives for cellulosic fibers for papermaking. Acrylics, polyesters and polyamides are among the synthetic organic polymers that have been used. These materials have one or more detractive properties or characteristics. Most synthetic organic fibers require binders or heat treatment when employed in a papermaking operation since the fibers lack the self-binding properties of wood pulp fibers. Recently synthetic fibrillated polyethylene fibers and polystyrene-based papermaking fibers have been inroduced. These fibers do possess self-binding capability and they can be blended in any proportion with wood pulp to make paper products by conventional papermaking techniques. However, such fibers are composed solely of organic high polymers and, as such, are expensive in comparison to wood pulp.

Polyvinyl alcohol fibers are used commercially in papermaking and are particularly suitable for such use because polyvinyl alcohol possesses substantial capacity for hydrogen bonding. These fibers, however, are considerably more expensive than the polymeric organic fibers above mentioned, and the cost substantially exceeds that of wood pulp.

Inorganic fibers, notably those composed of glass, metal, ceramics and minerals, are used to make paper or paperlike products. These fibers are not self-binding and furthermore they are generally rigid or stiff. Therefore the inorganic fibers are limited to uses in which either specific properties such as flame resistance, chemical inertness, strength, or capability of formation from water-free furnishes outweigh the detractive properties mentioned above. Films and fibers composed completely of colloidal swelling clay (bentonite or montmorillonite) are also known but these fibers or films require special waterproofing treatment and do not possess the properties and handling characteristics of wood pulp fibers.

Mineral-filled filaments based on polyesters and nylon have been suggested for woven textile use, the fillers being special grades of kaolin clay which function to dull the sheen of stocking products. Generally the clay filler is used in relatively small amount, typically 2% by weight. Hot melt spinning is employed in the production of such mineral-filled filaments. Reference is made to the following patents: U.S. Pat. Nos. 3,366,597, 3,397,171, 3,526,609, 3,778,514, 3,673,147, Canada Pat. No. 756,672.

Canadian Pat. No. 745,220 teaches the dilution of polyamides used in making fibers or filaments with 20% to 40% by weight of minus 10 micron "hydrated Kaolin or Fullers earth." The fillers are used as cost savers and, in some cases, have a desirable effect on physical properties. Polymerization of the polyamide-yielding compounds preferably takes place in the presence of the hydrated mineral filler. The mixture of polymer and filler is formed into filaments or films by a conventional melt-extrusion technique. Use of more than 50% filler, based on the polyamide, increases the viscosity of the melt to an extent whereby it is difficult to extrude the mixture. The "Fuller's earth" and "kaolin", insofar as they are described in the patent, are minerals which correspond approximately to the formula $Al_2O_3.2SiO_2.H_2O$.

THE INVENTION

A general object of the invention is the provision of novel synthetic fiber composites useful as partial or complete substitutes for wood pulp in the production of paper goods using conventional paper forming techniques and equipment.

Another object is a simple method for the production of such composite fibers, preferably by wet spinning. Still another object is the provision of novel paper products obtained by use of the novel composite fibers.

One aspect of the invention comprises fibers composed of insolubilized polyvinyl alcohol and a substantial amount, preferably over 30% by weight and more preferably at least 50% by weight, of a specific type of inorganic mineral filler, namely a colloidal acicular (needle-like) crystalline mineral or clay rich in such mineral. The mineral filler, which may be attapulgite, sepiolite or palygorskite, has ultimate particle dimensions and shape closely conforming to those of the cellulose microcrystals in a typical wood fiber. The cost of such composite fiber is substantially lower than that of fibers consisting of polyvinyl alcohol and the composite fibers have higher opacity as a result of the presence of the filler. The fibers conceptually resemble cellulosic fibers in that the acicular mineral crystals are analogous to crystalline cellulose micelles. The polyvinyl alcohol matrix is analogous to the regions of the more amorphous cellulose polymers. The high level of hydrogen-binding capability of the polyvinyl alcohol renders the surface of the fibers strongly adhesive to cellulose.

Conventional filler clays, namely kaolins, and other minerals such as calcium carbonate used as fillers or extenders for organic polymers, are not useful in practice of the invention.

Another aspect of the invention is the manufacture of a synthetic polymer-clay fiber composite. In a presently preferred embodiment an aqueous solution of substantially fully hydrolyzed polyvinyl alcohol is plasticized, formed into a dope and thereafter powdered acicular clay crystals are incorporated into the dope and fibers are spun using conventional wet spinning techniques and equipment. The fibers thus formed are washed, stretched and dried. For use in papermaking, the composite fibers are chopped to a suitable length and handled in the manner conventionally used with wood pulp. The composite fibers may be used alone or in combination with wood pulp. In another embodiment, the fibers are produced by melt spinning.

DETAILED DESCRIPTION OF PREFERRED EMBODIMENTS

Practice of the invention requires the use of colloidal grades of attapulgite or sepiolite clays or concentrates of colloidal attapulgite, sepiolite minerals or palygorskite obtained by beneficiation of ores or ore preconcentrates containing such minerals. Attapulgite clay is frequently called "Attapulgus clay" or "Georgia-Florida fullers earth." It is important to note that not all so-called "fullers earth" materials contain attapulgite or sepiolite minerals and thus not all products which fall within the terminology "fullers earth" may be utilized. According to Grim's CLAY MINERALOGY, 2nd Edition, 1968 (page 562), the term "fullers earth" is used broadly to designate a natural earth having oil decolorizing ability; these earths encompass materials composed of attapulgite, smectite (montmorillonite or bentonite) or kaolinite. The latter type of fullers earth is apparently the material used in practicing the subject matter of Canadian Pat. No. 745,200. Thus kaolinite has the approximate formula $Al_2O_3.2SiO_2.2H_2O$ substantially as reported in the Canadian patent. The formulae of smectites and attapulgite are considerably different. Attapulgite and sepiolite are hydrated magnesium aluminosilicate minerals, sepiolite being richer in magnesium.

The term "colloidal," referring to attapulgite, sepiolite or palygorskite, is well known in the art. These are unique clay minerals which occur naturally in the form of aggregates or bundles. When these aggregates are placed in water and subjected to high shear, they break down into individual colloidally dimensioned hydrated acicular crystals. Typically crystals of attapulgite are about 2000 A. long and have a mean diameter of about 50 to 100 A. The colloidal characteristics are retained when such clays are dried under mild conditions. However, when sufficient water is removed from the crystals by heat treatment, the colloidal properties are irreversibly destroyed. Such heat treatment, frequently called "activation," is employed in the manufacture of commercial sorbent grades. However, activation renders the attapulgite and sepiolite unsuitable for practice of the instant invention.

For purposes of the invention, the clay should be provided in the form of a powder such as the commercially available ATTAGEL ® 50 clay. A suitable filler may be produced by mildly drying the naturally-occurring clay to remove sufficient moisture to place the clay in a condition suitable for dry milling. This is followed by pulverization, using for example a fluid energy mill. The powder should be 325 mesh (Tyler) or finer.

Kaolin clay is unsuitable in practice of the invention. When substituted for colloidal attapulgite, for example, in amount of about 30% or more, wet-spun polyvinyl alcohol decrepitates upon emergence from the spinnerettes.

Sufficient clay should be employed to produce finished fibers containing colloidal clay in amount within the range of 30 to 75% of the dry weight of the fibers. (Dry weight refers to the weight determined after heating fibers to constant weight at 220° F.) When more than 75% filler is employed, the fibers tend to be excessively brittle when water from the spinning bath is removed. Fibers containing less than 30% filler are more costly than fibers containing less filler and they lack the opacity of synthetic fibers containing large amount of filler. Generally fibers containing about 40% to 60% filler are preferred.

A typical spinning dope is prepared from a 10% solution of hydrolyzed (low acetate) polyvinyl alcohol. By way of example, the polyvinyl alcohol may be one characterized by the fact that a 40% aqueous solution has a viscosity in the range of about 28 to 32 centipoises. Polyvinyl alcohol having a somewhat higher acetate content may be employed but substantially completely hydrolyzed polyvinyl alcohol is preferred. The solution of polyvinyl alcohol is heated to about 70° C. A plasticizer such as glycerol is added. Typically about 2 to 20 parts by weight of plasticizer is used per 100 parts by weight polyvinyl alcohol. Approximately 1% by weight of glyoxal is added to the hot mixture and a catalytic amount of hydrochloric acid is added to promote the reaction. The purpose of the glyoxal treatment is to crosslink the polyvinyl alcohol polymers and to partially acetalize the hydroxyl groups so as to render the resultant fibers insoluble in water. Other means for crosslinking polyvinyl alcohol, well known in the art, can be used.

After cooling the mixture, an amount of colloidal clay, such as "ATTAGEL ®" 50, is blended in with high shear until the filler constitutes up to 75% by weight of the dry solids of the dope. The total solids of the dope are adjusted to a spinnable consistency, generally from 16 to 21%, depending on the level of inorganic filler to be used. The dope is degassed by known means such as centrifugation and is extruded by conventional spinning equipment into a conventional coagulating bath. A saturated solution of sodium sulfate at 60° C. is illustrative of a suitable coagulating bath. The fibers thus formed are washed in acetone or other conventional solvent and this is followed by a water wash. The fibers are then stretched, air dried and wound.

Procedures described in Japanese Pat. Nos. 75 20,162 and 72 42,054 are illustrative of those that can be used for the wet spinning. Subsequent treatment by heat, stretching and formalization may be employed singly or in combination to decrease solubility, lower the denier or improve the tensile strength. The resulting fibers may be cut to a staple length, typically 2 to 5 mm., or into longer lengths for subsequent degradation in a hydropulper, beater or related refining equipment.

The fibers may be blended with wood pulp fibers in a range of proportions for subsequent formation into paper, using a conventional papermaking machine and papermaking technology.

The following example is given to illustrate a presently preferred method for practicing the invention. The invention is not limited thereto.

PREPARATION OF SPINNING DOPE

A 99% hydrolyzed polyvinyl alcohol of average molecular weight=80,000 was dissolved in water at 70° C. to form a 10% solution by weight. To this solution was added 10 parts of glycerin (PVA=100 parts), and 2.5 parts of a 40% solution of glyoxal and a small amount of concentrated hydrochloric acid. The solution was cooled to room temperature under moderate agitation. To this solution was added a predispersed colloidal grade of attapulgite clay (ATTAGEL ® 50) whose particles have been reduced to the ultimate particle size. The polyvinyl alcohol/attapulgite ratio was 1.5:1 by weight. This suspension was mixed at a very high shear rate until the attapulgite was clearly dispersed throughout the suspension. As this high shear rate introduced large amounts of air, the suspension was centrifuged at 3000 r.p.m. for several minutes after addition of a foam control agent. The suspension was then remixed under gentle shear to resuspend any settled solids and water was added to adjust the total solids to 18%. Brookfield viscosity was 3450 cp. at 20 r.p.m. (spindle #6).

FIBER FORMATION

The spinning dope was placed in a feed tank and fed under 40 p.s.i. of nitrogen to a metering pump. The dope was filtered by an in-line filter consisting of a fiberglass cloth backed by a 325 mesh screen. From there the dope was fed to a spinnerette which was protected by a fiberglass pre-filter and a 200 mesh screen. The spinnerette was a circular, 18-hole jet whose aperture dimensions were 250 mm. The dope was metered at 0.43 cc./second. When the dope appeared at the aperture of the jet, the jet section was lowered into a coagulant bath consisting of a 25% solution of sodium sulfate, with sulfuric acid added to a pH of 3.5. Bath temperature was 40° C. The 18 fiber tow was drawn at a takeup rate of 10 m./minute and had a residence time in the bath of approximately 5 seconds. The tow was then washed with acetone and water to remove the salt and stretched in two stages by 30% and 15% successively for a total elongation of 50%. The tow was air dried and wound on a spool in a manner identical with that used for yarns. The resulting fibers had a dog-bone cross section of major axis 57 micrometers and minor axis of 35 micrometers (approximately). The fiber had a denier of 414 and a tenacity of 0.07 g./denier.

PAPER FORMATION

An aliquot of a batch of pulp consisting of 50% bleached sulfite hard wood and 50% bleached sulfite soft wood, beaten to 15° CSF, and containing 33.75 grams of the pulp was placed in a Century disintegrator. A 3.75 gram sample of synthetic fibers was cut to an average fiber length of 10 mm., and the fibers were added to 100 ml. of an aqueous solution of malachite green dye (0.2% w/w) adjusted to a pH of 3.0 with sulfuric acid. After remaining in the bath for 10 minutes with gentle agitation, the fibers were filtered and washed repeatedly with cold water until no dye cold be discerned on the filtering medium. The fibers were then placed in a Waring Blendor with 250 cc. of water and subjected to 1-5 second bursts of shear until all the fibers were well separated. The synthetic fiber slurry so obtained was placed in a Century disintegrator with the pulp and diluted to 8.0 liters. After five minutes' agitation in the disintegrator the pulp was transferred to a Noble and Wood sheet mold. The sheet weight was adjusted to 3.75 grams for an 8×8 inch sheet (6.13 lbs./3300 sq. ft.) and the sheets were formed using alum to adjust the pH to 4.5. The sheets so formed were wet pressed between felts and dried at 140° F. with the wire side against the drum. The sheets were conditioned for two days at 50% R.H. and 72° F. When compared to control sheets consisting of 100% natural pulp, the following property changes were noted: burst 32.43% increase; fold 95.68% increase; breaking length 2.66% decrease. Visual examination of the sheet at 60X and 140X magnification revealed good fiber distribution and sheet formation. Except for the dye, the synthetic fibers were indistinguishable from the natural pulp fibers.

In another test sheets were formed from the synthetic fibers as described above except that no dye was used on the synthetic fibers and that 5% of a filler kaolin clay (Min Chem Special) was incorporated into the sheet. When compared to control sheets containing only natural pulp and 5% filler, the following property changes were noted: burst 93.26% increase; fold 312.1% increase; breaking length 18.5% increase; brightness 1.65% decrease; opacity 3.42% decrease. Visual examination of the sheets revealed good formation but as the synthetic fibers could not be distinguished from the natural pulp fibers, it was not possible to ascertain the degree of distribution.

In the previous example, synthetic fibers were produced by wet spinning. Alternatively synthetic fibers of the invention may be formed by melt extrusion. In order to accomplish such melt extrusion, it is first necessary to modify the PVA with 4-15 mole percent of side chains consisting of $C_4$-$C_{20}$ alkyl groups. The PVA may then be heated above its melting point without concomitant decomposition. Plasticizers such as glycerin, ethylene glycol or higher glycols may be incorporated. While in the molten state, colloidal attapulgite which has been oven dried may be blended into a clay solids level of at least 40% in a suitable mixer such as a Banbury mixer and thence fed to the melt extrusion apparatus to form fibers of suitable dimensions and tenacity. The fibers so formed may be cut into convenient lengths for combination with wood pulp to form a papermaking furnish. The furnish may then be beaten or jordanned or otherwise refined. The films may be separately refined for subsequent combination with refined pulp to form a papermaking furnish. Paper containing these fibers may then be made in conventional fashion.

We claim:

1. Fibers comprising insolubilized polyvinyl alcohol having disseminated therein acicular particles of a colloidal grade of crystalline clay selected from the group consisting of attapulgite, sepiolite and palygorskite, said clay being present in amount sufficient to impart opacity but not in excess of an amount which would result in brittle fibers, said fibers being capable of being partially or totally substituted for cellulose fibers in the making of a sheet of paper by conventional paper-forming means.

2. The fibers of claim 1 wherein said acicular particles of clay constitute from about 30% to 75% of the total dry weight thereof.

3. The fibers of claim 2 wherein said clay comprises sepiolite.

4. The fibers of claim 2 wherein said clay comprises attapulgite.

5. The fibers of claim 4 wherein said acicular particles of attapulgite clay have a mean particle diameter of about 50 A. to 100 A. and a mean length of about 2000 A.

6. Insolubilized, plasticized polyvinyl alcohol fibers having colloidal acicular attapulgite clay crystals being present in amount within the range of from 30% to 65% of the dry weight of said fibers.

7. Fibers of polyvinyl alcohol insolubilized by glyoxal and having colloidal attapulgite clay crystals uniformly distributed therein, said attapulgite clay crystals being present in amount within the range of from about 40% to 60% of the dry weight of said fibers, said fibers containing glycerine as a plasticizing agent, said fibers being capable of being partially or totally substituted for cellulose fibers in the making of a sheet of paper by conventional paper-forming means.

8. In the production of paper using a wet forming method conventional for use with a wood pulp fiber furnish and including forming suitable fibers into an aqueous papermaking pulp fiber furnish by agitating said fibers in water, forming said pulp furnish into a sheet, pressing said sheet and drying said sheet, the improvement which comprises preparing said pulp furnish by agitating in water fibers at least a portion of which comprise insolubilized plasticized polyvinyl alcohol having disseminated therein acicular particles of a colloidal grade of crystalline clay selected from the group consisting of attapulgite, sepiolote and palygorskite, said clay being present in amount sufficient to impart opacity but not in excess of an amount which would result in brittle fibers.

9. The process of claim 8 wherein said fiber furnish comprises a mixture of wood pulp fibers and said fibers of insolubilized polyvinyl alcohol containing said clay.

10. The process of claim 8 wherein said fibers of insolubilized plasticized polyvinyl alcohol containing said clay are the sole fibers in said fiber furnish.

* * * * *